United States Patent [19]

Stringer

[11] 4,045,666
[45] Aug. 30, 1977

[54] HEADLAMPS

[75] Inventor: Roy Ernest Stringer, Birmingham, England

[73] Assignee: Chrysler United Kingdom Limited, London, England

[21] Appl. No.: 644,517

[22] Filed: Dec. 29, 1975

[30] Foreign Application Priority Data

Jan. 6, 1975 United Kingdom .................. 487/75

[51] Int. Cl.² .............................................. B60Q 1/06
[52] U.S. Cl. ................................ 240/61.8; 74/501 R
[58] Field of Search ...................... 240/1.4, 61.2, 61.6, 240/61.8; 74/501 R

[56] References Cited

U.S. PATENT DOCUMENTS

| 3,005,087 | 10/1961 | Klein | 240/61.8 X |
| 3,057,262 | 10/1962 | Jacobson | 240/61.6 X |
| 3,286,545 | 11/1966 | Malachowski | 240/61.6 X |

*Primary Examiner*—Richard A. Wintercorn
*Attorney, Agent, or Firm*—Edward F. Connors

[57] ABSTRACT

A headlamp assembly includes a headlamp mounted to tilt in a vertical plane. An adjustment mechanism for varying the angle of tilt consists of a pivoted lever connected to the headlamp through a push/pull rod, a Bowden cable mechanism one end of the cable of which is connected to the lever and a linearly slidable block to which the other end of the cable is connected. The block is adjusted by a screw threaded rod mounted for rotational adjustment which engages in a threaded bore in the block.

10 Claims, 2 Drawing Figures

HEADLAMPS

BACKGROUND OF THE INVENTION

1. Field of the Invention

The invention relates to headlamp assemblies for motor vehicles.

2. Description of the Prior art

The suspension systems of modern motor vehicles are relatively soft and have considerable travel for the comfort of the vehicle passengers but load variation varies the attitude of the vehicle body and therefore the angle of the vehicle headlamps with respect to the ground. Thus lights directed correctly when the vehicle carries the driver only may be raised by passengers and/or luggage in the rear of the vehicle to such an extent that they no longer provide proper illumination of the road ahead for the driver and may also dazzle drivers of vehicles travelling in the opposite direction. A number of arrangements have been proposed for enabling the driver to make instant adjustments to the angle of the vehicle headlamps from within the vehicle to cater for the effect of load variation in the vehicle. For example, U.K. patent specification No. 1,336,210 discloses an adjustment system comprising a single control cable actuated by a worm gear mechanism adjusted by a rotatable knob. The cable is connected to a relay member and further cables are connected between the relay member and lever systems which act on the headlamps to tilt the latter as the cable system is adjusted by the knob. The disadvantage of this system is that the multiplicity of cables make fine adjustment of the headlamps difficult and it is fine adjustments which are required to cater for the variations in the inclination of the vehicle body.

A further proposed solution to the problem is disclosed in U.K. patent specification No. 1,318,924 which describes an adjustment mechanism for vehicle headlamps comprising a control knob which rotates a notched wheel to rotate a bell-crank lever. The latter acts on a cable connected to a slider which rotates a rachet wheel which, in turn, moves a lever to tilt the lamp. This arrangement suffers from a number of disadvantages. Firstly, adjustment of the lamp is limited to half the number of notches on the ratchet wheel. Secondly, in certain positions of the mechanism pressure on one headlamp would tilt it to a new position out of phase with the other headlamp. Thirdly, the ratchet wheel can be rotated in one direction only and the headlamp must pass through its maximum tilt position before the tilt angle can be reduced.

It is an object of this invention to provide a headlamp assembly in which the tilt angle of the headlamp can be adjusted by a mechanism which overcomes the disadvantages of the mechanisms referred to above.

SUMMARY OF THE INVENTION

According to the present invention there is provided a headlamp assembly for a motor vehicle comprising a headlamp, means to mount the headlamp for tilting movement about a first axis extending normally to the direction in which the headlamp is focussed, resilient means for biassing the headlamp in one direction of tilt about said axis and a Bowden cable mechanism for pulling the headlamp in the opposite direction, said Bowden cable mechanism having an outer sheath, means for anchoring the ends of the sheath against movement and an inner cable one end of which is connected to the headlamp at a location spaced from the axis about which the headlamp tilts, and the other end of which is connected to an adjustment device for adjusting the position of the inner cable with respect to the outer sheath, the adjustment device comprising a cable anchorage, a mounting for the anchorage for supporting the anchorage for linear sliding movement and screw means for adjusting the position of the anchorage with respect to the mounting.

DESCRIPTION OF THE PREFERRED EMBODIMENTS

Figure 1:
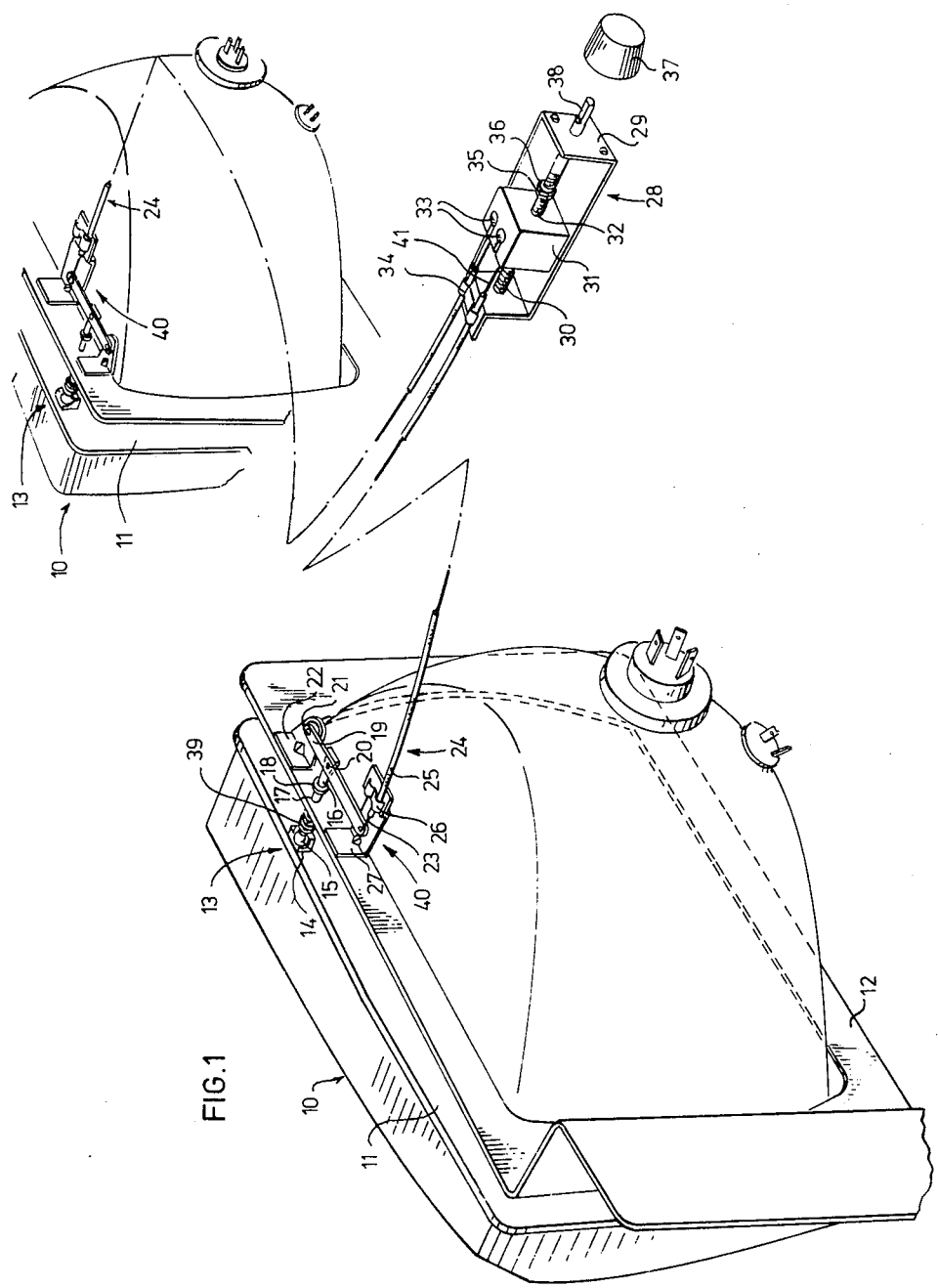
FIG. 1 is a perspective view of one headlamp system.

FIG. 1 of the drawings shows two similar headlamp assemblies each having a headlamp 10, mounted in a flanged housing assembly 11, which is pivotally mounted at its lower flange to an apertured panel 12. Part of the rear of the flanged housing assembly 11 extends through the apertured panel 12. The pivotable mounting means (not shown) may comprise two spaced-apart threaded adjusters, which can be used, in a known manner, to adjust the orientation of the headlamp 10 and flanged housing assembly 11 with respect to the apertured plate 12.

When the headlamp 10 is mounted in a motor vehicle, the apertured plate 12 is attached to or forms part of the motor vehicle body.

A socket for a ball and socket joint, indicated generally at 13 is mounted on the rear of the flanged housing assembly 11. The socket is formed in a boss 14 secured to the rear face of the flanged housing assembly 11. The socket receives a ball 15 formed at one end of a push-/pull rod 16, which extends with clearance through an aperture 17 in the apertured panel 12. The other end of the rod 16 is pivotably connected to a lever 19 at a point 20.

One end of the lever 19 is, pivotally mounted at 21 to a bracket 22 which is attached to apertured panel 12, whilst the other end of the lever is connected to one end of the flexible inner cable 23 of a Bowden cable 24. The outer casing 25 of the Bowden cable 24 is anchored against movement by a clip 26, which is mounted on a bracket 27, which is in turn mounted on the rear of the apertured panel 12. The other end of the Bowden cable 24 is attached to a remotely located adjustment device, generally indicated at 28 common to both headlamp assemblies. The adjustment device may conveniently be located in the passenger compartment The adjustment device 28 comprises a bracket 29 a threaded rod 30 which is rotatably mounted in the bracket 29 is such a position that axial movement of the rod is restrained and a cable connecting block 31 having a threaded aperture 32 in which the rod engages and a pair of side by side cable retaining slots 33, one of which retains the other end of inner cable 23. The outer casing 25 is anchored against movement by a clip 34 mounted on the bracket 29. A setting nut 35 and lock nut 36 together form an adjustable stop on the rod 30. A knob 37 is keyed on to an end 38 of rod 30 projecting from bracket 29.

A spring 39 is disposed between the flanged housing 11 and the apertured panel 12 to urge the upper part of the flanged housing 11 away from the apertured panel 12.

When the knob 37 is rotated, the threaded rod 30 rotates causing the cable connecting block 31 to travel along the rod 30 in a direction determined by the direction of rotation of the threaded rod 30. When the cable connecting block 31 travels along the threaded rod 30 the movement is transmitted to the lever 19 via the inner cable 23. If the inner cable 23 pulls the lever towards the clip 26, the rod 16 is pulled in the same general direction, which causes the ball 15 and boss 14 to pull the housing flange 11, and hence the headlamp 10, towards the apertured plate 12, against the action of spring 39. Conversely if the lever is moved away from the clip 26, the rod 16 is pushed in the same general direction allowing the spring 39 to force the housing flange 11 and the apertured plate 12 apart, the latter movement being limited by an annular stop 18 on the rod 16 engaging the rearward side of the panel 11.

In normal use the headlamp is initially set at its correct alignment, when the vehicle is unladen by rotation of the knob 37. When the correct alignment has been reached, the setting nut 35 is adjusted so that it lies against an adjacent face of the cable connecting block 31 and then is locked in position by the locknut 36. The stop thus formed determines when the control is re-set to the original position. If the vehicle is then laden the alignment of the headlamp 10 can then be corrected by rotation of the knob 37.

The adjustment device would normally be mounted adjacent the dashboard of a vehicle, with the knob 37 being placed on the dashboard so that the headlamps can be adjusted from inside the vehicle.

The headlamp assembly is such that it returns the headlamp 10 to its selected alignment even when the headlamp 10 has been subjected to external forces. Thus if a force is applied to the headlamp 10, which would tend to force the headlamp 10 towards the housing flange 11, this force will be transmitted to the rod 16 and lever 19 through cable 24, to the cable connecting block 31. The cable connecting block 31 will resist the force, because it is locked by the threaded rod 30 from axial movement other than that caused by rotation of the threaded rod 30. The outer sleeve 25 of the Bowden cable 24 resists any buckling of the inner cable 23 within the sleeve. Thus, the cable buckles at one or both of its exposed portions, indicated at 40 and 41 to permit movement of the lever 19 towards clip 26. When the force is removed the spring 39 will force the housing flange 11 away from the apertured flange 12 and the expanded portions of the inner cable will straighten and hence the headlamp returns to its selected alignment.

Figure 2:
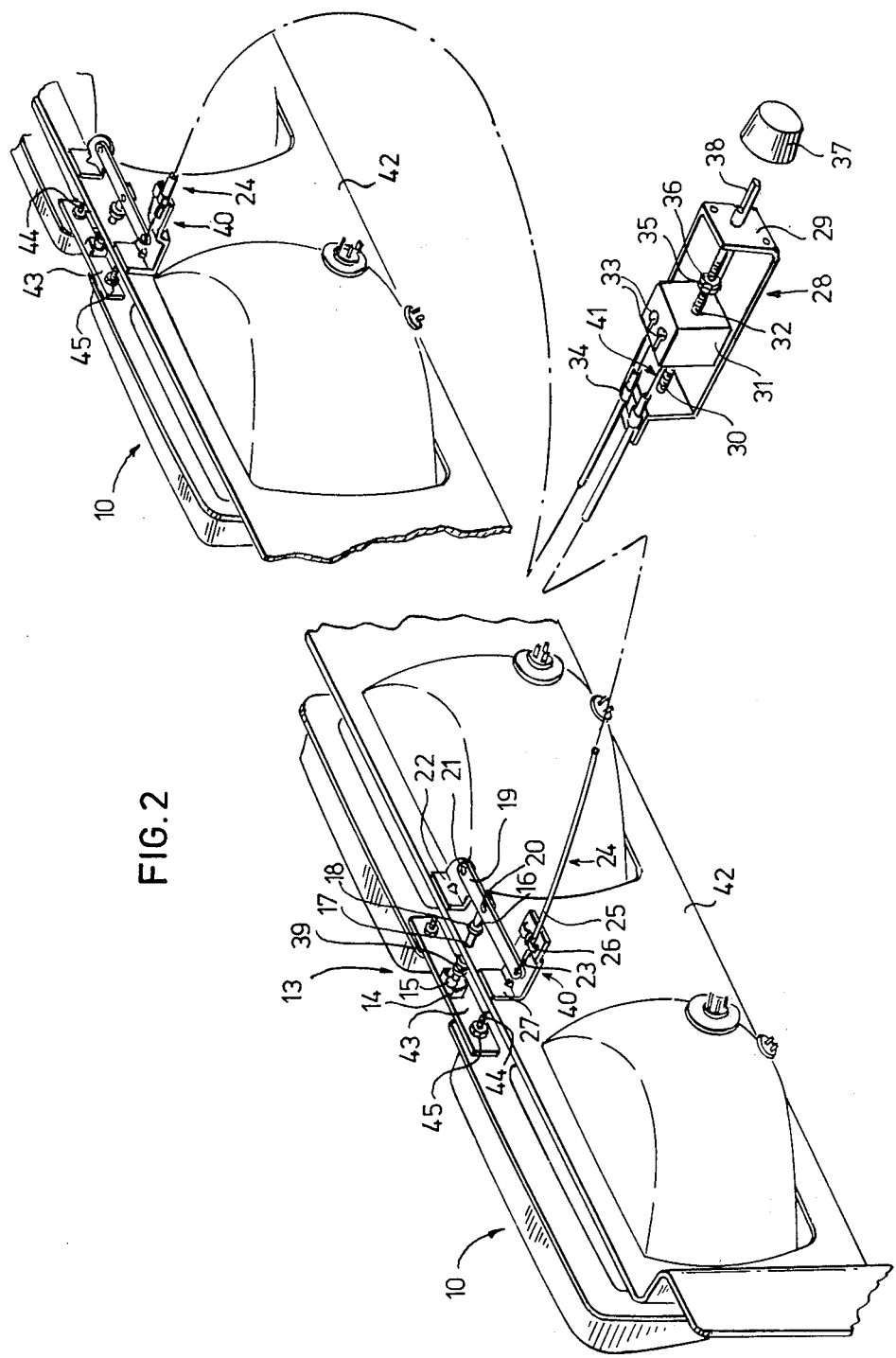
FIG. 2 is a perspective view of a further system.

In a four headlamp assembly, an adjustment device as described above may be arranged to operate only the dipping lamp of each pair through Bowden cable mechanisms as described above or all four headlamps may be arranged to be adjusted for tilt as shown in FIG. 2 to which reference is now made. Each pair of headlamps 10 is mounted in a common double apertured panel 42 and the two headlamps are interconnected by a bridge 43. The socket for the ball and socket joint 13 is mounted on the bridge and the ball 15 is connected through rod 16 and lever 19 to a Bowden cable 24 as described earlier. The inner cables 23 of the Bowden cables for the two pairs of headlamps are connected to a single adjustment device 28 as described earlier.

The ends of the bridge 43 may be adjustably attached to the lamp housings to permit individual adjustment of each lamp. The adjustable attachments may, for example comprise studs indicated at 44 projecting from the lamp housings through the bridge 43 and secured to the bridge by nuts 45 on either side of the bridge.

We claim:

1. An adjustable headlamp assembly for a motor vehicle comprising a headlamp, means for mounting the headlamp for tilting movement about a first axis extending normally to the direction in which the headlamp is focussed, resilient means for biassing the headlamp in one direction of tilt about said axis and a Bowden cable mechanism for pulling the headlamp in the opposite direction, said Bowden cable mechanism having an outer sheath with opposite ends, and an inner cable with opposite ends, means for anchoring the ends of the sheath against movement, one end of the inner cable being connected to the headlamp at a location spaced from the axis about which the headlamp tilts and the other end of the inner cable being connected to an adjustment device disposed remote from the headlamp and adapted to be operated from the interior of the motor vehicle for adjusting the position of the inner cable with respect to the outer sheath, the adjustment device comprising an anchorage fixed on the cable, a mounting for the anchorage for supporting the anchorage for linear sliding movement so as to move the cable linearly and screw means engaged with the anchorage for adjusting the position of the anchorage with respect to the mounting with the headlamp being adjusted in relation to the rotation of the screw means.

2. An assembly as claimed in claim 1, wherein the screw means for adjusting the position of the cable anchorage comprise a threaded rod rotatably supported on the mounting for rotation but against axial movement, the rod engaging in a threaded aperture in the cable anchorage so that rotation of the rod adjusts the cable anchorage with respect to the mounting.

3. An assembly as claimed in claim 1 wherein the adjustment device includes an adjustable stop for limiting the extent of axial movement of the cable anchorage with respect to the rod.

4. An assembly as claimed in claim 3 wherein the adjustable stop comprises a lock nut mounted on the rod.

5. An assembly as claimed in claim 3 wherein the adjustment stop comprises a lock nut or a pair of lock nuts mounted on the rod.

6. An assembly as claimed in claim 2 wherein a knob is provided on the threaded rod for rotational adjustment of the rod.

7. An assembly as claimed in claim 1 wherein said one end of the cable is connected to a lever mechanism having a push/pull rod which is in turn pivotally connecting to the headlamp.

8. An assembly as claimed in claim 7 wherein the push/pull rod is connected to the headlamp by a ball formed on the rod engaging in a socket on the headlamp assembly.

9. An assembly as claimed in claim 1 comprising a plurality of headlamps each having a Bowden cable mechanism as aforesaid connected to a single adjustment device for adjusting the headlamps simultaneously.

10. An assembly as claimed in claim 1 comprising two pairs of headlamps, the headlamps of each pair being connected to tilt together and a Bowden cable mechanism being connected to each pair of headlamps, the two Bowden cable mechanisms being connected to a single adjustment device for adjusting the headlamps.

* * * * *